(12) United States Patent
Ando

(10) Patent No.: US 11,410,441 B2
(45) Date of Patent: Aug. 9, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Yuki Ando, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 44 days.

(21) Appl. No.: 17/006,905

(22) Filed: Aug. 31, 2020

(65) Prior Publication Data

US 2021/0279496 A1  Sep. 9, 2021

(30) Foreign Application Priority Data

Mar. 6, 2020  (JP) .............................. JP2020-038885

(51) Int. Cl.
*G06V 30/146* (2022.01)
*G06V 10/24* (2022.01)
*G06V 30/414* (2022.01)
*G06V 30/416* (2022.01)
*G06V 30/10* (2022.01)

(52) U.S. Cl.
CPC ........ *G06V 30/1478* (2022.01); *G06V 10/242* (2022.01); *G06V 30/414* (2022.01); *G06V 30/416* (2022.01); *G06V 30/10* (2022.01)

(58) Field of Classification Search
CPC ........... G06K 2209/01; G06K 9/00463; G06K 9/00469; G06K 9/3208; G06K 9/3283; G06F 40/166; G06V 30/10; G06V 30/414; G06V 30/416; G06V 30/1478; G06V 10/242
See application file for complete search history.

(56) References Cited

U.S. PATENT DOCUMENTS

| | | | | |
|---|---|---|---|---|
| 2007/0091373 | A1* | 4/2007 | Sato ...................... | G06F 40/103 358/1.18 |
| 2012/0143958 | A1* | 6/2012 | Augustine .............. | G06Q 50/01 709/205 |
| 2015/0248391 | A1* | 9/2015 | Watanabe ........... | G06F 16/9554 715/226 |

FOREIGN PATENT DOCUMENTS

| | | |
|---|---|---|
| JP | 2003085187 | 3/2003 |
| JP | 2003087484 | 3/2003 |
| JP | 2010-102668 | 5/2010 |

* cited by examiner

*Primary Examiner* — Daniel G Mariam
(74) *Attorney, Agent, or Firm* — JCIPRNET

(57) ABSTRACT

An information processing apparatus includes a processor. The processor is configured to extract from a memory an image concerning a user in accordance with content of a document and to attach the extracted image to the document.

6 Claims, 11 Drawing Sheets

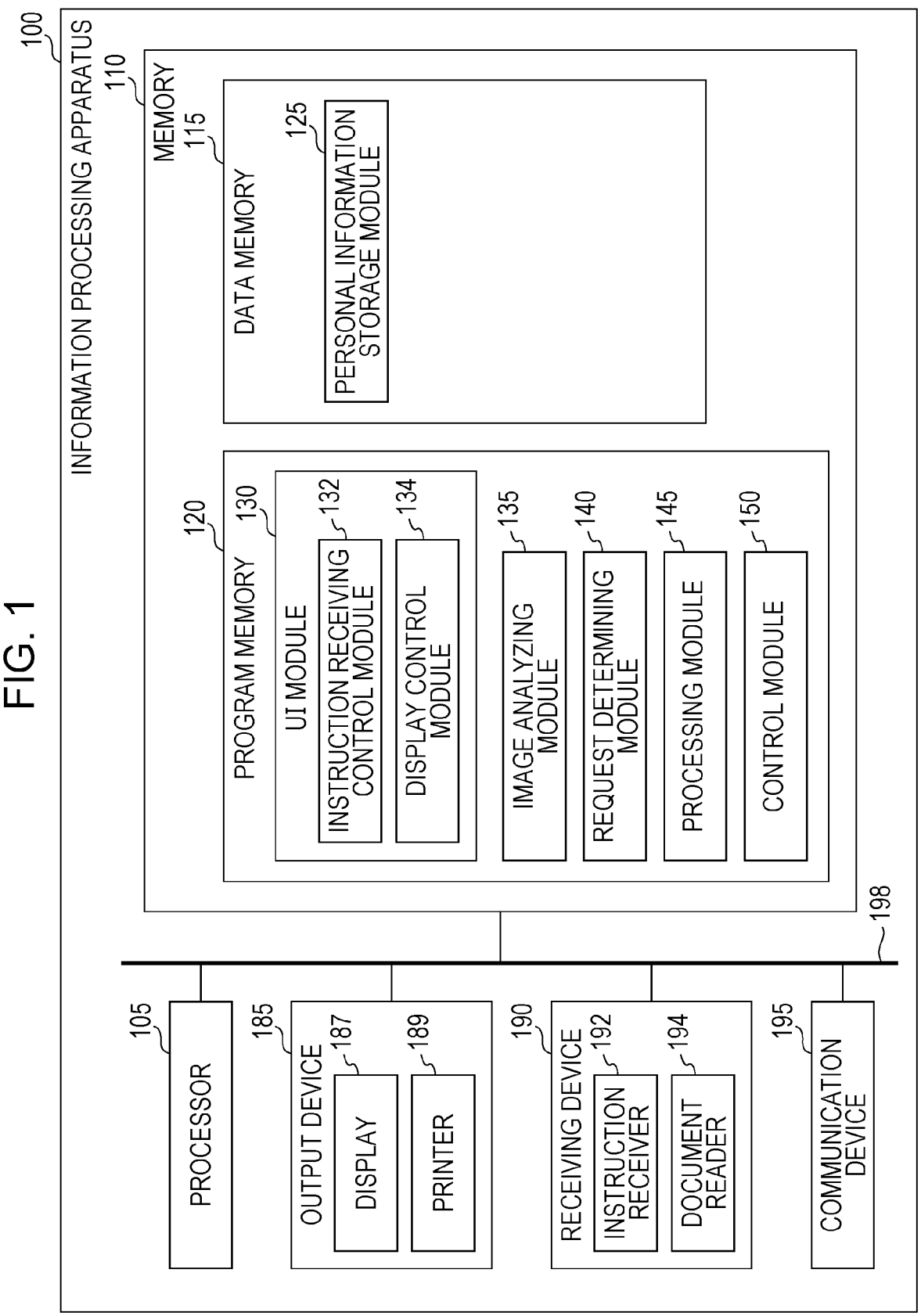

FIG. 5

| 505 | 510 | 515 | 520 | 525 | 530 | |
|---|---|---|---|---|---|---|
| USER ID | NAME | ADDRESS | AGE | GENDER | DRIVER'S LICENSE IMAGE | ... |
| | | | | | | |

500

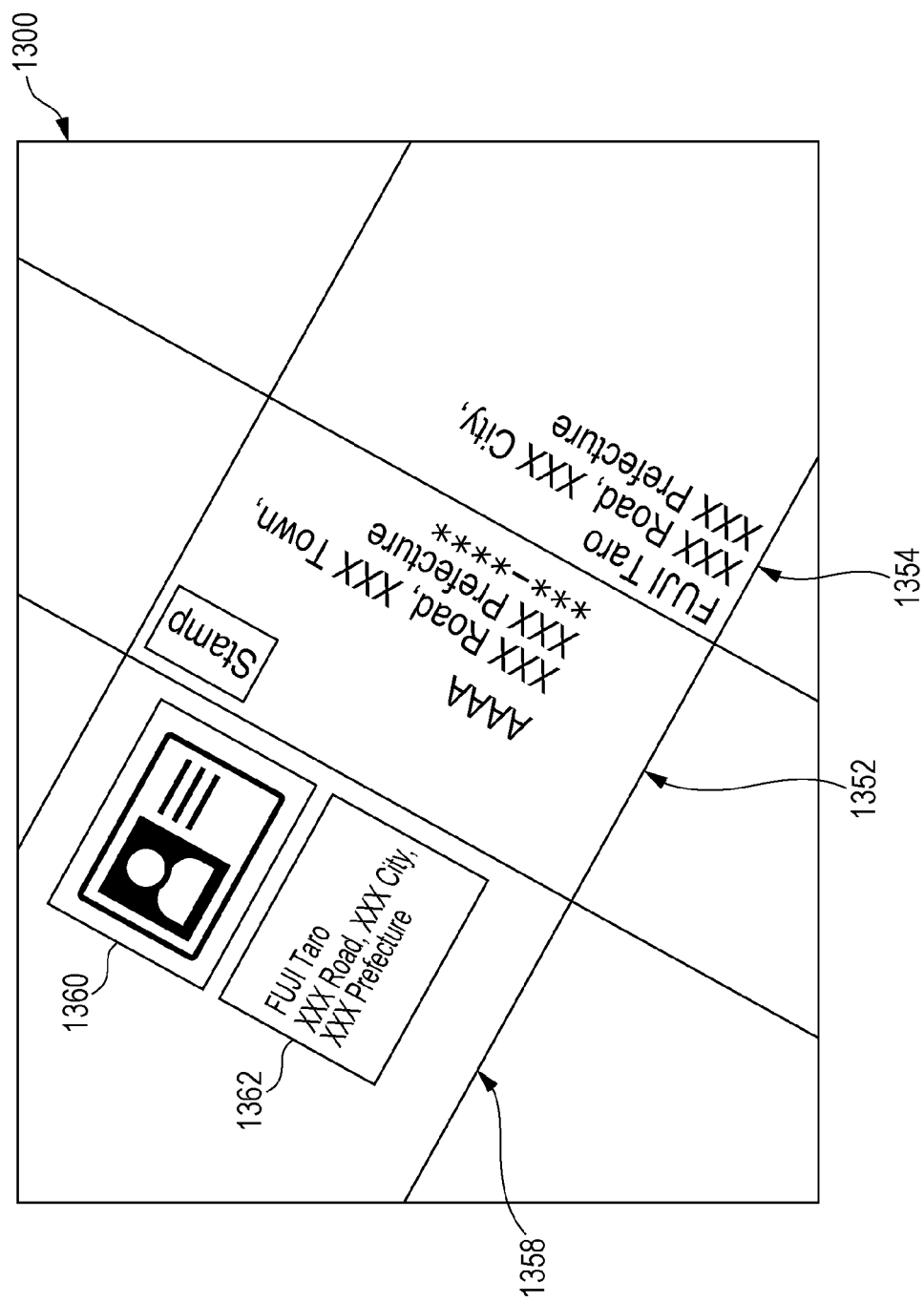

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-038885 filed Mar. 6, 2020.

BACKGROUND

(i) Technical Field

The present disclosure relates to an information processing apparatus and a non-transitory computer readable medium.

(ii) Related Art

When multiple document images having different forms are input, a user is required to append indexes to these document images while checking the document images one by one, which is likely to cause input errors. Japanese Unexamined Patent Application Publication No. 2003-085187 discloses a document registration system that addresses the above-described issue. Even when multiple document images having different forms are input, this document registration system is able to identify the forms which match the respective document images and automatically append indexes to the corresponding document images based on the areas set in the individual forms.

Japanese Unexamined Patent Application Publication No. 2010-102668 discloses a metadata extracting device that is able to extract keyword/metadata without using layout information even from a non-standard document which partially has a common structure but can basically be edited freely, such as a semi-fixed form. The metadata extracting device includes a template creating processor, a template checking processor, and a metadata extracting processor. The template creating processor registers one or more distinctive character strings and a predetermined region surrounding each of the distinctive character strings in a template. The distinctive character strings determine the document type of a reference document, which serves as the basic form of the non-standard document. For an input document from which metadata will be extracted, the template checking processor reads the character string within each of the regions registered in the template and checks whether the input document includes any of the character strings registered in the template so as to determine the document type of the input document. Based on the determination result of the template checking processor, by using the template, the metadata extracting processor extracts, from the input document, a character string which matches the description format of metadata within the reference document as metadata of the input document.

Depending on the type of document, a user appends indexes to a document and then registers the document in a document manager. In the case of a FAX document, it is sometimes necessary to record it on paper, as well as being registered in the document manager. Japanese Unexamined Patent Application Publication No. 2003-087484 discloses a document processing system that can handle the above-described situation. The document processing system executes recognition processing on document image data obtained from an external device, obtains attribute information concerning the obtained document image data, and then judges whether to print the document image data based on the attribute information. If it is judged that the document image data will be printed, the document processing system creates a print file of the document image data and automatically sets the above-described recognition results as indexes and registers the document image data and the indexes in the document manager. The document processing system then sends the created print file to a printer.

SUMMARY

Aspects of non-limiting embodiments of the present disclosure relate to providing of an information processing apparatus and a non-transitory computer readable medium in which an image can be attached to a document with a reduced number of user operations, compared with when a user attaches an image to a document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to extract from a memory an image concerning a user in accordance with content of a document and to attach the extracted image to the document.

BRIEF DESCRIPTION OF THE DRAWINGS

An exemplary embodiment of the present disclosure will be described in detail based on the following figures, wherein:

FIG. 1 is a block diagram illustrating conceptual modules forming an example of the configuration of the exemplary embodiment;

FIG. 5 illustrates an example of the data structure of a personal information management table;

FIG. 13 illustrates an example of an additional document, which is a result of processing executed in the exemplary embodiment.

DETAILED DESCRIPTION

Figure 2A:
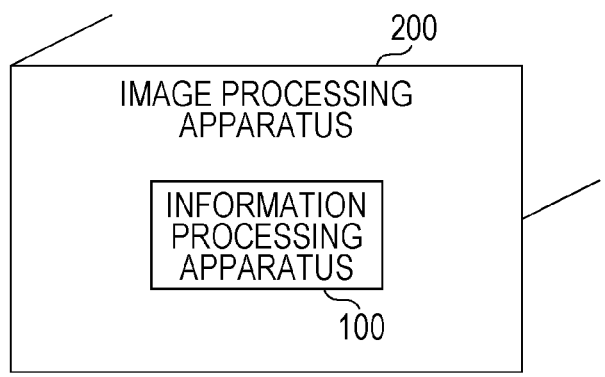
FIGS. 2A and 2B are schematic diagrams illustrating examples of the system configuration utilizing the exemplary embodiment.

An exemplary embodiment of the disclosure will be described below with reference to the accompanying drawings.

FIG. 1 is a block diagram illustrating conceptual modules forming an example of the configuration of the exemplary embodiment.

Generally, modules are software (computer programs) components or hardware components that can be logically separated from one another. The modules of the exemplary embodiment of the disclosure are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus (or a device) may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include a mere man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted.

An information processing apparatus 100 according to the exemplary embodiment has a function of attaching an image to a document. As shown in FIG. 1, the information processing apparatus 100 at least includes a processor 105 and a memory 110. A bus 198 connects the processor 105 and the memory 110 so that they can exchange data therebetween. The information processing apparatus 100 may also include an output device 185, a receiving device 190, and a communication device 195. Data is exchanged between the processor 105, the memory 110, the output device 185, the receiving device 190, and the communication device 195 via the bus 198.

FIG. 1 also illustrates an example of the hardware configuration of a computer implementing the exemplary embodiment. The computer on which a program serving as the exemplary embodiment is executed has the hardware configuration shown in FIG. 1, for example, and more specifically, the computer is a personal computer (PC) or a server. The computer shown in FIG. 1 includes the processor 105 as a processing unit and the memory 110 as a storage device.

As the processor 105, one or multiple processors may be used. The processor 105 may include a central processing unit (CPU) or a microprocessor, for example. If multiple processors 105 are used, they may be implemented as either one of a tightly coupled multiprocessor and a loosely coupled multiprocessor. For example, multiple processor cores may be loaded within a single processor 105. A system in which plural computers connect with each other by a communication channel so as to behave like one computer in a virtual manner may be utilized. As a specific example, multiple processors 105 may be a loosely coupled multiprocessor and be formed as a cluster system or a computer cluster. The processor 105 executes programs stored in a program memory 120.

The memory 110 may include semiconductor memory units within the processor 105, such as a register and a cache memory. The memory 110 may include a main memory device (main storage device) constituted by a random access memory (RAM) and a read only memory (ROM), for example, an internal storage device, such as a hard disk drive (HDD) and a solid state drive (SDD), having a function as a persistent storage, an external storage device and an auxiliary storage device, such as a compact disc (CD), a digital versatile disk (DVD), a Blu-ray (registered trademark) disc, a universal serial bus (USB) memory, and a memory card. The memory 110 may also include a storage, such as a server, connected to the computer via a communication network.

The memory 110 includes as major elements a program memory 120 principally storing programs and a data memory 115 principally storing data. In the program memory 120, in addition to the module programs shown in FIG. 1, programs, such as an operating system (OS) for starting the computer, may be stored. In the data memory

115, data, such as parameters that appropriately change during the execution of the module programs, may be stored.

The output device 185 includes a display 187 and a printer 189, for example. The display 187 is a liquid crystal display, an organic electroluminescence (EL) display, or a three-dimensional (3D) display, for example. The display 187 displays processing results of the processor 105 and data stored in the data memory 115 as text or image information, for example. The printer 189, which is a printer or a multifunction device, prints processing results of the processor 105 and data stored in the data memory 115, for example. The output device 185 may include a speaker and an actuator for vibrating equipment.

The receiving device 190 includes an instruction receiver 192 and a document reader 194.

The instruction receiver 192, such as a keyboard, a mouse, a microphone, and a camera (including a gaze detection camera), receives data based on an operation (including motion, voice, and gaze) performed on the instruction receiver 192 from a user.

A device having both the functions of the display 187 and the instruction receiver 192, such as a touchscreen, may be used. In this case, to implement the function of the keyboard, a keyboard drawn on the touchscreen by using software, that is, a software keyboard or a screen keyboard, may be used instead of a physical keyboard.

As a user interface (UI), the display 187 and the instruction receiver 192 are principally used.

The document reader 194, such as a scanner, a camera, or a multifunction device, reads a document and receives resulting image data.

The communication device 195 is a communication network interface, such as a network card, for enabling the computer to connect to another apparatus via a communication network.

In the above-described exemplary embodiment, concerning elements implemented by a software computer program, such a computer program is read into the program memory 120 having the hardware configuration shown in FIG. 1, and the exemplary embodiment is implemented by a combination of software and hardware resources.

The hardware configuration of the information processing apparatus 100 in FIG. 1 is only an example, and the exemplary embodiment may be configured in any manner if the modules described in the exemplary embodiment are executable. For example, as the processor 105, a graphics processing unit (GPU) or a general-purpose computing on graphics processing unit (GPGPU) may be used. Some modules may be configured as dedicated hardware, for example, an application specific integrated circuit (ASIC) or a field-programmable gate array (FPGA), or some modules may be installed in an external system and be connected to the information processing apparatus 100 via a communication network. A system, such as that shown in FIG. 1, may be connected to a system, such as that shown in FIG. 1, via a communication network, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, and a multifunction device (an image processing device including at least two of the functions of a scanner, a printer, a copying machine, and a fax machine).

The processor 105 is connected to the memory 110, the output device 185, the receiving device 190, and the communication device 195 via the bus 198. The processor 105 executes processing in accordance with a computer program describing an execution sequence of each module, which is a program stored in the program memory 120. For example, in response to the document reader 194 reading an image of a document, the processor 105 executes processing on the image by using the corresponding module within the program memory 120, and causes the data memory 115 to store the processing result therein, the printer 189 to print the processing result, or the communication device 195 to send the processing result to another apparatus.

The memory 110 includes the data memory 115 and the program memory 120 and is connected to the processor 105, the output device 185, the receiving device 190, and the communication device 195 via the bus 198.

The data memory 115 stores a personal information storage module 125.

The personal information storage module 125 stores information on a user operating the information processing apparatus 100. The information on a user indicates at least an image concerning the user. The information on a user may also indicate the name and the address of the user. Specific examples of information stored in the personal information storage module 125 will be discussed later with reference to FIG. 5.

The program memory 120 stores a UI module 130, an image analyzing module 135, a request determining module 140, a processing module 145, and a control module 150.

The UI module 130 includes an instruction receiving control module 132 and a display control module 134. The UI module 130 executes processing concerning UIs.

In accordance with an instruction received by the instruction receiver 192, the instruction receiving control module 132 sends information indicating this instruction to the image analyzing module 135, the request determining module 140, the processing module 145, and the control module 150.

The display control module 134 performs control so that processing results obtained by the image analyzing module 135, the request determining module 140, the processing module 145, and the control module 150 are displayed on the display 187.

The control module 150 causes the image analyzing module 135, the request determining module 140, the processing module 145 to extract an image to be attached to a document from the personal information storage module 125 in accordance with the content of the document and to attach the extracted image to the document. A document to be processed by the modules within the program memory 120 is image data indicating a document read by the document reader 194. An example of a document to be processed by the modules is a document which requests a user to attach an image concerning the user to the document. An example of such a document is an application form which requests a user to attach a copy of the driver's license of the user, for example. A document to be processed by the modules is not restricted to this type of document, and may be a business document and an advertising flyer.

When the content of a document is text within the document, the control module 150 may execute the following processing.

When the text of a document includes a predetermined character string, the control module 150 may extract an image to be attached to the document from the personal information storage module 125 and attach the extracted image to a region having a predetermined relationship with the predetermined character string.

The predetermined character string is a character string that describes a request for a user to attach an image concerning this user to the document. An example of the predetermined character string is "Please attach a copy of your driver's license".

Examples of a region having a predetermined relationship with the predetermined character string are a region next to the predetermined character string, a region on the bottom right of the predetermined character string, and a region including the predetermined character string.

When the content of a document is represented by a form of the document, the control module 150 may execute the following processing.

When the form of a document is a predetermined form, the control module 150 may extract an image to be attached to the document from the personal information storage module 125 and attach the extracted image to a region within the form.

The predetermined form is a document form including a field in which an image concerning a user will be attached. An example of the predetermined form is a document form including a region, such as a field in which a copy of the driver's license of a user will be attached. A document form will be discussed later when the image analyzing module 135 is explained.

The document form of a document may be determined from the title of the document, the arrangement of fields within the document, the sizes of the fields within the document, for example.

The control module 150 may adjust an image in accordance with a region with which the image will be combined and then attach the adjusted image to the region.

Adjusting of an image include at least one of enlarging the image, reducing the image, rotating the image, and color/monochrome conversion of the image.

The control module 150 may adjust an image so that the orientation of the image is adjusted to a tilt of a region with which the image will be combined or a tilt of characters around the region. In this case, adjusting of an image is rotating the image.

The image analyzing module 135 analyzes the content of a document read by the document reader 194. The content of a document may be (1) the text in the document or (2) the document form of the document.

Concerning (1) the text in a document, as a result of performing character recognition on the image of the document, the image analyzing module 135 can extract text in the document.

Concerning (2) the document form of a document, a frame or a field in which a user is supposed to fill and a frame or a field to which an image concerning the user will be attached, and the positions of such frames and fields are fixed. Such a document is also called a template or a format. The image analyzing module 135 may use a known technique to analyze and determine the form of a document, based on the sizes of frames, the aspect ratios of frames, a combination of frames, and the type, thickness, color of frame borders.

By using the analyzing result generated by the image analyzing module 135, the request determining module 140 determines the content of a request described in the document for a user, that is, determines the image concerning the user to be attached to the document. The request determining module 140 may also determine the content of a description to be filled in the document by a user.

For example, in the case of using the character recognition results generated by the image analyzing module 135, if a character string "Please attach A concerning a user" is found, the request determining module 140 determines that image A concerning the user is required.

In the case of using the analyzed form of the document by the image analyzing module 135, the request determining module 140 determines the image to be attached to the document by using a predetermined rule. This rule is set for each document form to indicate what kind of information is required, and more specifically, what kind of image is required to be attached to which frame of a document form.

The request determining module 140 may determine the content of a request described in the document for a user, by using both of the text and the form of the document. For example, the image analyzing module 135 may perform character recognition on the title of a document and then determine the form of the document. Or, the image analyzing module 135 may perform character recognition on a character string positioned near a frame of a document, and the request determining module 140 may determine the content of a description to be filled in the frame.

In accordance with the content of a request determined by the request determining module 140, the processing module 145 extracts an image concerning the user from the personal information storage module 125 and then attaches the extracted image to the position at which this request is being made. The position at which the request is being made may be a position overlapping the region where the request is described or a frame next to the position at which the request is described.

Figure 2B:
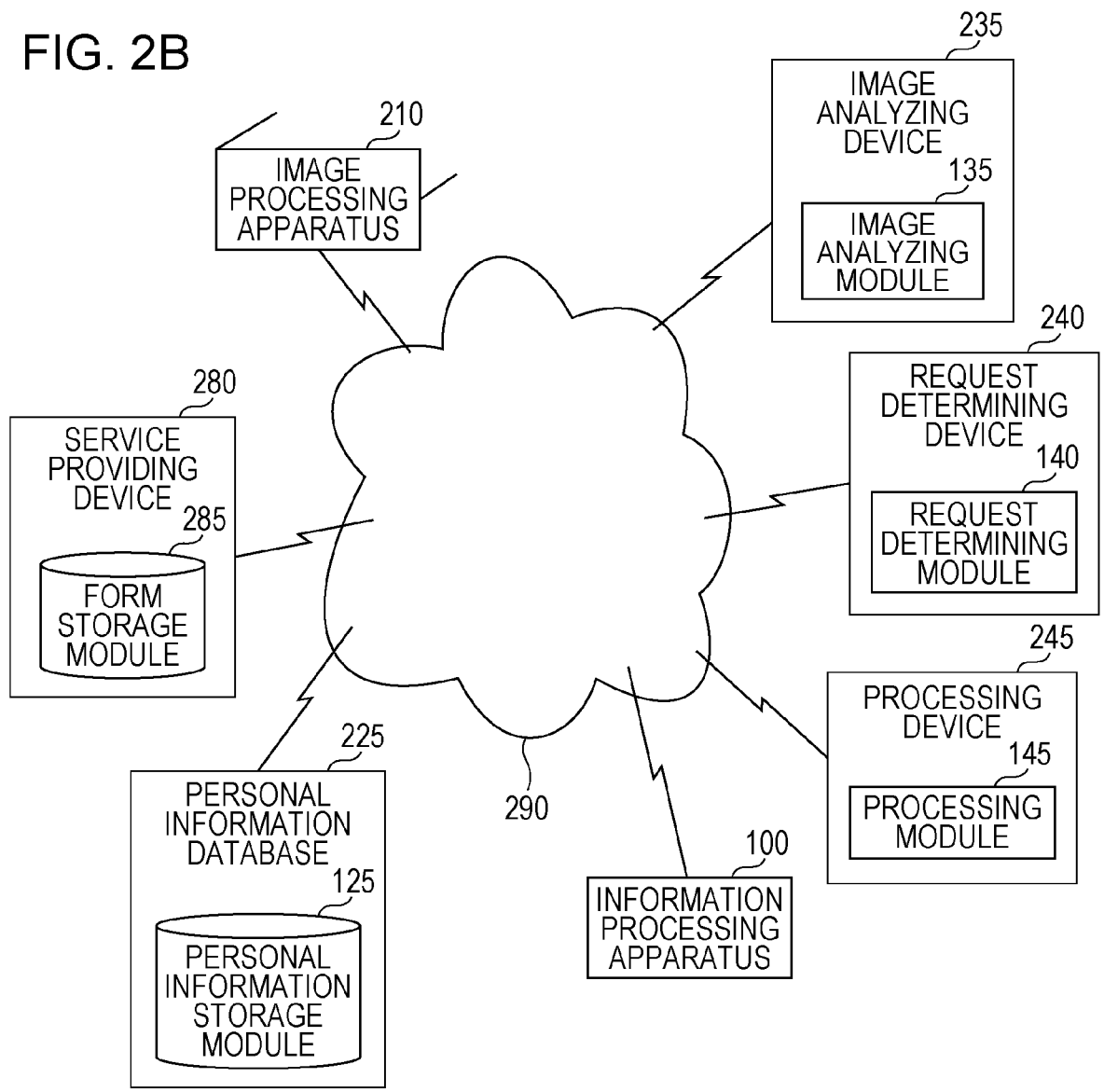

FIGS. 2A and 2B are schematic diagrams illustrating examples of the system configuration utilizing the exemplary embodiment.

FIG. 2A illustrates an example of the system configuration of the exemplary embodiment constructed as a stand-alone system. An image processing apparatus 200 includes the information processing apparatus 100. The printer of the image processing apparatus 200 is used as the printer 189, the scanner of the image processing apparatus 200 is used as the document reader 194, and the touchscreen of the image processing apparatus 200 is used as the display 187 and the instruction receiver 192.

A user causes the image processing apparatus 200 to read a document, which is a form. The image processing apparatus 200 attaches an image concerning the user stored in the information processing apparatus 100 to the read document. The user prints the image of the document so as to obtain the document appended with the image concerning this user. This configuration is applicable to a situation where a copy of the driver's license of a user is attached to an application form for opening a bank account, for example. In this case, the application form is an example of a document, and the image of the driver's license of the user is an example of an image concerning a user.

FIG. 2B illustrates an example of the system configuration of the exemplary embodiment constructed as a network system. The information processing apparatus 100, an image processing apparatus 210, a personal information database 225, an image analyzing device 235, a request determining device 240, a processing device 245, and a service providing device 280 are connected with one another via a communication network 290. The communication network 290 may be a wireless or wired medium, or a combination thereof, and may be, for example, the Internet or an intranet as a communication infrastructure.

A user causes the image processing apparatus 210 to read a document. The image processing apparatus 210 sends the image of the read document to the information processing apparatus 100. The information processing apparatus 100 attaches an image concerning the user stored in the information processing apparatus 100 to the received document and returns the image of the document appended with the image concerning the user to the image processing apparatus 210. The image processing apparatus 210 prints the image of the received document so that the user can obtain the document appended with the image concerning the user.

The functions of the information processing apparatus 100 may be distributed over the personal information database 225, the image analyzing device 235, the request determining device 240, and the processing device 245. The personal information database 225 includes the personal information storage module 125. The image analyzing device 235 includes the image analyzing module 135. The request determining device 240 includes the request determining module 140. The processing device 245 includes the processing module 145. That is, the personal information database 225, the image analyzing device 235, the request determining device 240, and the processing device 245 may operate cooperatively to implement the functions of the information processing apparatus 100.

The service providing device 280 including a form storage module 285 may be used. More specifically, the image processing apparatus 210 obtains a document from the service providing device 280 in response to an operation performed by a user. The service providing device 280 provides a corresponding document stored in the form storage module 285 to the image processing apparatus 210. This configuration enables the user to obtain the document, which is a form, appended with an image concerning the user without the need to cause the image processing apparatus 210 to read the document. There may be a situation where, after a user has obtained a document read by the image processing apparatus 210, it requires another document. In this case, the user may extract such a document from the service providing device 280. For example, depending on the type of read document, not only an image attached to the read document, but also another document for creating an envelope, for example, may be required. The information processing apparatus 100 may extract such a document from the service providing device 280. A document required for creating an envelope, for example, will be discussed later with reference to FIG. 10.

Figure 3:
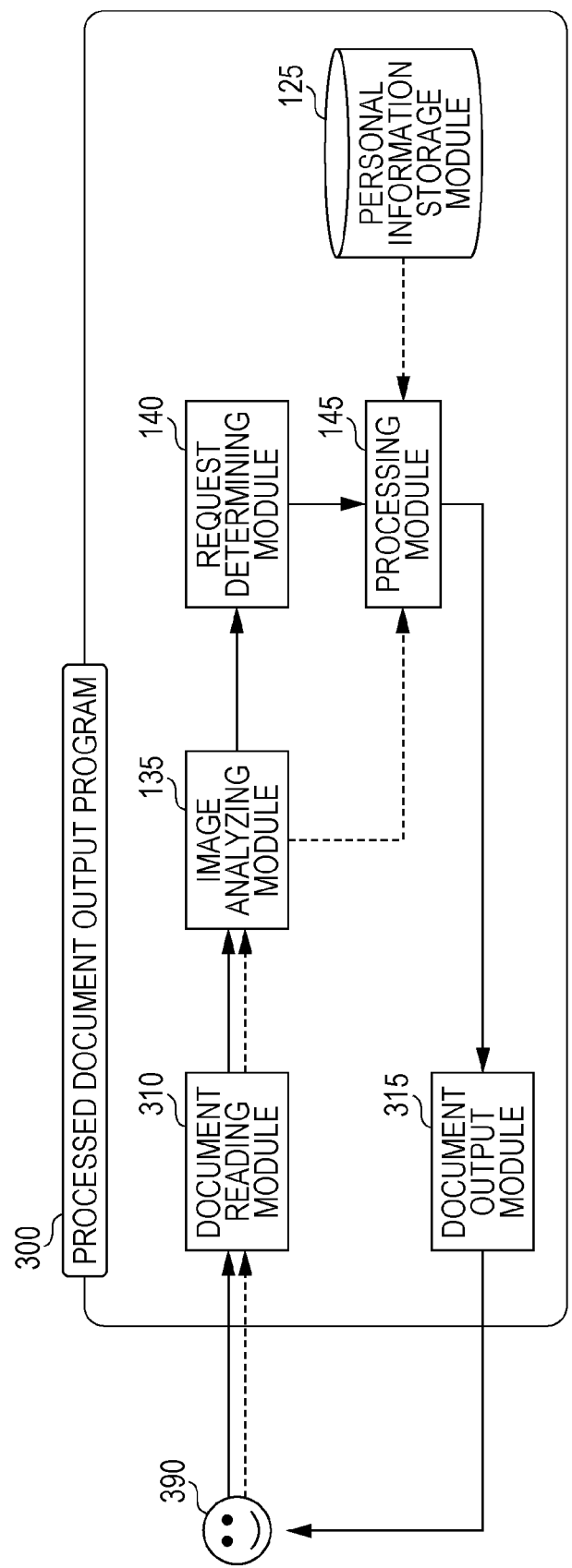
FIG. 3 is a block diagram illustrating conceptual modules forming an example of the configuration of the exemplary embodiment.

FIG. 3 is a block diagram illustrating conceptual modules forming an example of the configuration of the exemplary embodiment. The module configuration shown in FIG. 3 is a more specific module configuration of the information processing apparatus 100 shown in FIG. 1.

A processed document output program 300 includes the personal information storage module 125, the image analyzing module 135, the request determining module 140, the processing module 145, a document reading module 310, and a document output module 315.

The document reading module 310 is connected to the image analyzing module 135. The document reading module 310 generates or obtains the image of a document in response to an instruction from a user 390. The document reading module 310 may read the document with a scanner or receives the document from the service providing device 280.

The image analyzing module 135 is connected to the document reading module 310, the request determining module 140, and the processing module 145. The image analyzing module 135 analyzes the image of the document generated or obtained by the document reading module 310 so as to determine the form of the document or to extract text in the document by performing character recognition on the image of the document.

The request determining module 140 is connected to the image analyzing module 135 and the processing module 145. The request determining module 140 determines information required for the document by using the text or the form of the document, which is the analyzing result obtained by the image analyzing module 135. If the form of the document is used, the request determining module 140 extracts information required for the document from a table indicating the association between forms and items of information required for the individual forms. If the text is used, the request determining module 140 executes language processing, such as morphological analysis, so as to extract information required for the document. When the text in the document includes a predetermined character string, the request determining module 140 determines that the image corresponding to the predetermined character string is information required for the document. For example, if the predetermined character string indicates "Please attach a copy of your driver's license", the image of the driver's license of the user 390 is information required for the document. If the predetermined character string indicates "Please write down your address", the address of the user 390 is information required for the document. If no information is required for the document, processing executed by the processing module 145 is not necessary.

The personal information storage module 125 is connected to the processing module 145. The personal information storage module 125 stores images concerning the user 390, such as the image of the driver's license of the user 390. The personal information storage module 125 may also store text information, such as the address of the user 390, in addition to the images concerning the user 390.

The processing module 145 is connected to the personal information storage module 125, the image analyzing module 135, the request determining module 140, and the document output module 315. The processing module 145 extracts the required information determined by the request determining module 140 from the personal information storage module 125 and combines the required information with the document generated or obtained by the document reading module 310. If required information is not stored in the personal information storage module 125, the user 390 inputs required information. For example, if required information is an image, the user 390 may read the image by using the document reading module 310. If required information is text, the user 390 may input text by using a keyboard, for example. When combining the required information, such as an image, with the document, the processing module 145 may adjust the image in accordance with a region with which the image will be combined.

The document output module 315 is connected to the processing module 145. The document output module 315 prints the document which is combined with the required information by the processing module 145. As a result, the user 390 obtains the document appended with the required information.

Figure 4:
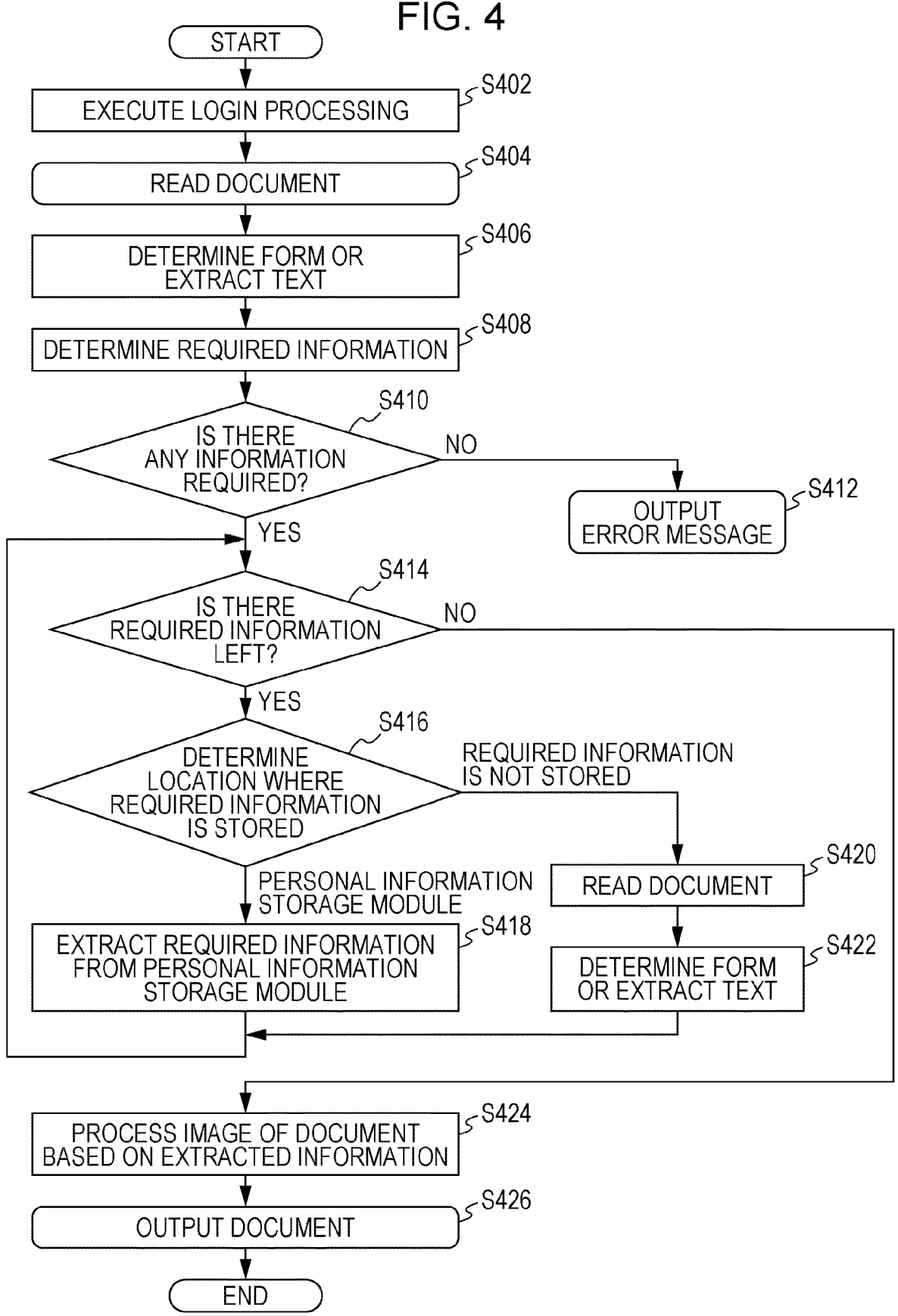
FIG. 4 is a flowchart illustrating an example of processing executed in the exemplary embodiment.

FIG. 4 is a flowchart illustrating an example of processing executed in the exemplary embodiment.

In step S402, login processing is executed. By this login processing, the user 390 can be specified, and an image concerning the user 390 can also be determined.

In step S404, a document is read. This document includes a region to which an image will be attached, and may be an application form for an opening a bank account, for example.

In step S406, the form of the document is determined or text in the document is extracted. The text can be extracted by performing character recognition on the image of the document. The form of the document is determined, based on the sizes and the aspect ratios of frames and a combination of frames, for example, as stated above.

In step S408, required information is determined. In step S410, it is judged whether there is any information required for the document. If information is required, the process proceeds to step S414. If no information is required, the process proceeds to step S412.

In step S412, an error message is output.

In step S414, it is judged whether there is any required information left. If required information is left, the process proceeds to step S416. If no more required information is left, the process proceeds to step S424.

In step S416, the location where the required information is stored is determined. If the location storing the required information is the personal information storage module 125, the process proceeds to step S418. If the required information is not stored in the personal information storage module 125, the process proceeds to step S420.

In step S418, the required information is extracted from the personal information storage module 125. Then, the process returns to step S414.

In step S420, the document is read by scanning.

In step S422, the form of the document is determined or text in the document is extracted, and then, the required information is determined from the read document. Then, the process returns to step S414. If the entirety of the scanned document is used, step S422 may be omitted.

In step S424, the image of the document is processed in accordance with the extracted information. For example, text, such as the address of the user 390, is added to the image of the document, and the image of the driver's license of the user 390 is attached to the image of the document. Adjusting, such as, enlarging, reducing, rotating, and color/monochrome conversion, may be executed on text to be indicated in the image of the document or the image to be attached to the image of the document.

In step S426, the document is output. As a result of executing a series of the above-described operations, the processed document is printed.

The personal information storage module 125 stores a personal information management table 500, for example.

Figure 5:
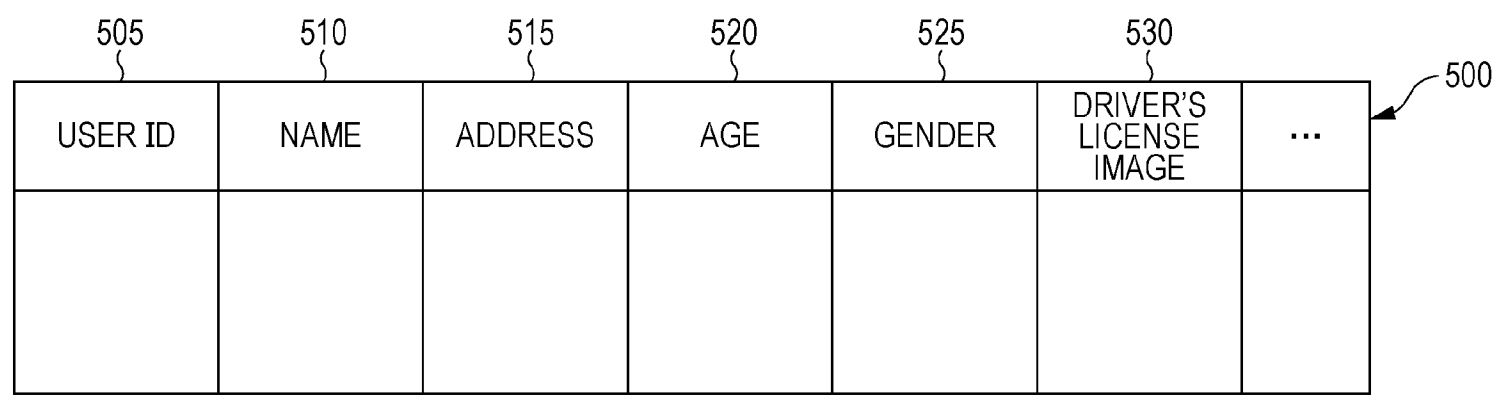

FIG. 5 illustrates an example of the data structure of the personal information management table 500. The personal information management table 500 has a user identification (ID) field 505, a name field 510, an address field 515, an age field 520, a gender field 525, and a driver's license image field 530. In the user ID field 505, information for uniquely identifying a user (more specifically, a user ID) in the exemplary embodiment is stored. In the name field 510, the name of this user is stored. In the address field 515, the address of this user is stored. In the age field 520, the age of this user is stored. In the gender field 525, the gender of this user is stored. In the driver's license image field 530, the image of the driver's license of this user is stored. The personal information management table 500 may also store the image of the insurance card or the individual number card (ID card) of this user, for example.

Figure 6:
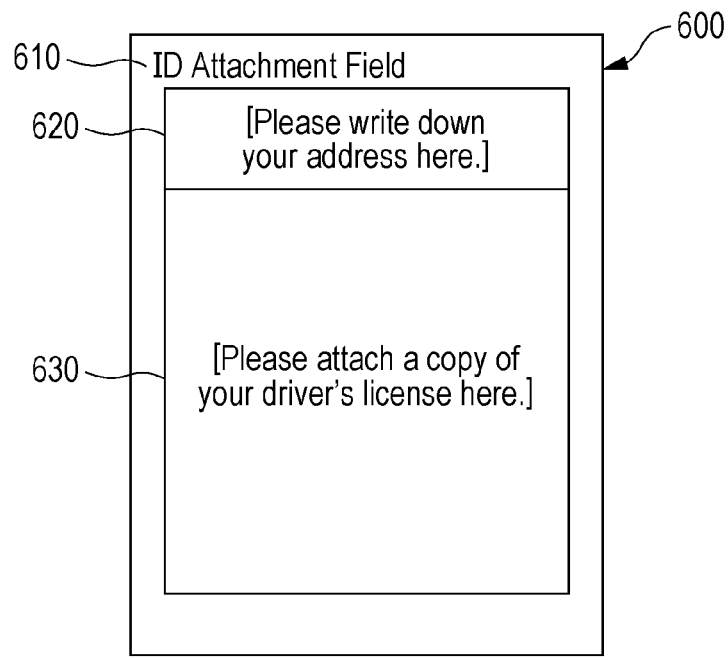
FIG. 6 illustrates an example of a document to be processed in the exemplary embodiment.

FIG. 6 illustrates an example of a document to be processed in the exemplary embodiment.

A document 600, which is a read document, has a title 610, an address field 620, and a driver's license attachment field 630. The title 610 shows that the name of the document 600 is "ID attachment field". In the address field 620, the character string "Please write down your address here" is written. In the driver's license attachment field 630, the character string "Please attach a copy of your driver's license here" is written.

As a result of analyzing the form of the document 600, for example, the document 600 is found to be an ID attachment form, based on the aspect ratios of the address field 620 and the driver's license attachment field 630 and a combination thereof. Based on the table indicating the association between forms and items of required information for the individual forms, it is determined that the ID attachment form requires the address of the user and the image of the driver's license of the user.

As a result of analyzing the text within the document 600, for example, the character string "Please write down your address here" is recognized within the address filed 620, and the character string "Please attach a copy of your driver's license here" is recognized within the driver's license attachment field 630. One item of required information is determined to be the address of the user, based on the character string "Please write down your address here". Another item of required information is determined to be the image of the driver's license of the user, based on the character string "Please attach a copy of your driver's license here".

Figure 7:
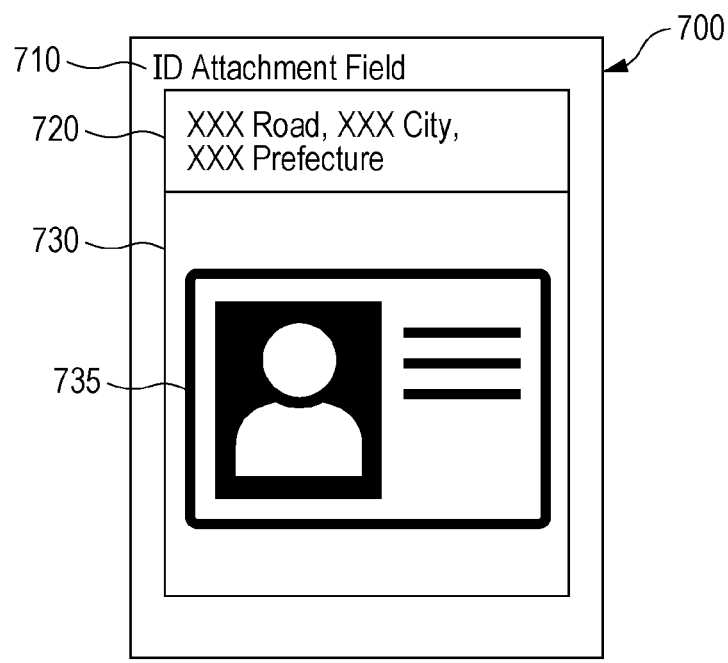
FIG. 7 illustrates an example of a document, which is a result of processing executed in the exemplary embodiment.

FIG. 7 illustrates an example of a document, which is a result of processing executed in the exemplary embodiment.

A document 700 is an example of the printing result by the information processing apparatus 100 after the document 600 is read in response to an instruction from the user 390 logged in the information processing apparatus 100. The document 700 has a title 710, an address field 720, and a driver's license attachment field 730. The title 710 shows that the name of the document 700 is "ID attachment field", similar to the title 610 of the document 600. In the address field 720, "XXX Road, XXX City, XXX Prefecture", which is the address of the user 390, is written. In the driver's license attachment field 730, an image 735 of the driver's license of the user 390 is attached.

Figure 8:
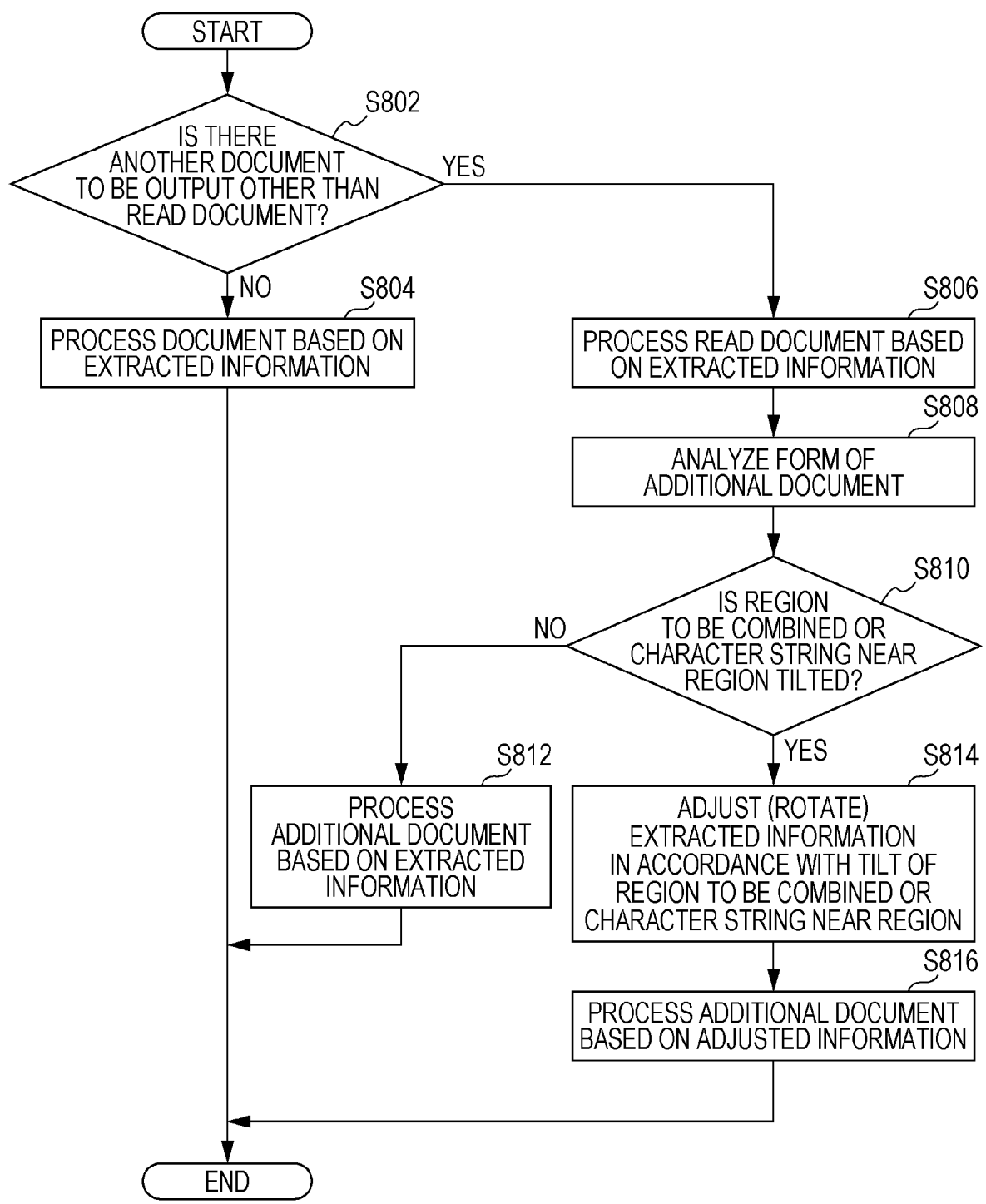
FIG. 8 is a flowchart illustrating an example of processing executed in the exemplary embodiment.

FIG. 8 is a flowchart illustrating an example of processing executed in the exemplary embodiment.

Step S424 in the flowchart of FIG. 4 may be replaced by processing in the flowchart of FIG. 8. FIG. 8 illustrates an example of processing to be executed when, not only a read document, but also a document for creating an envelope, is required, as discussed above.

It is judged in step S802 whether there is another document to be output in addition to a read document. If there is no document to be output other than the read document, the process proceeds to step S804. If there is another document to be output, the process proceeds to step S806. It is now assumed that a document for creating an envelope is an additional document. Such an additional document is extracted from the service providing device 280.

In step S804, the document is processed based on extracted information. This processing is equivalent to step S424 in FIG. 4.

In step S806, the read document is processed based on extracted information. This processing is equivalent to step S424 in FIG. 4.

In step S808, the form of the additional document is analyzed. For example, regions with which text, which is information concerning the user 390, and an image concerning the user 390 will be combined, are determined.

In step S810, it is judged whether a region with which the extracted information will be combined is tilted or a character string near such a region is tilted. If neither of the region nor the character string near the region is tilted, the process proceeds to step S812. If the region is tilted or the character string near the region is tilted, the process proceeds to step S814. For example, in the additional document, which is a document for creating an envelope, a region with which the extracted information will be combined may be tilted, which will be discussed later with reference to FIG. 10.

In step S812, the additional document is processed based on the extracted information. Step S812 is equivalent to step S424 in FIG. 4, except that the target document is the additional document.

In step S814, the extracted information is adjusted (rotated) in accordance with a tilt of the region with which the extracted information will be combined or a tilt of the character string near the region. The extracted information may be the address of the user 390 and the image of the driver's license of the user 390. Text and/or the image are adjusted (rotated) in accordance with a tilt of the region into which the extracted information will be combined or a tilt of the character string near the region.

In step S816, the additional document is processed based on the adjusted information.

Figure 9:
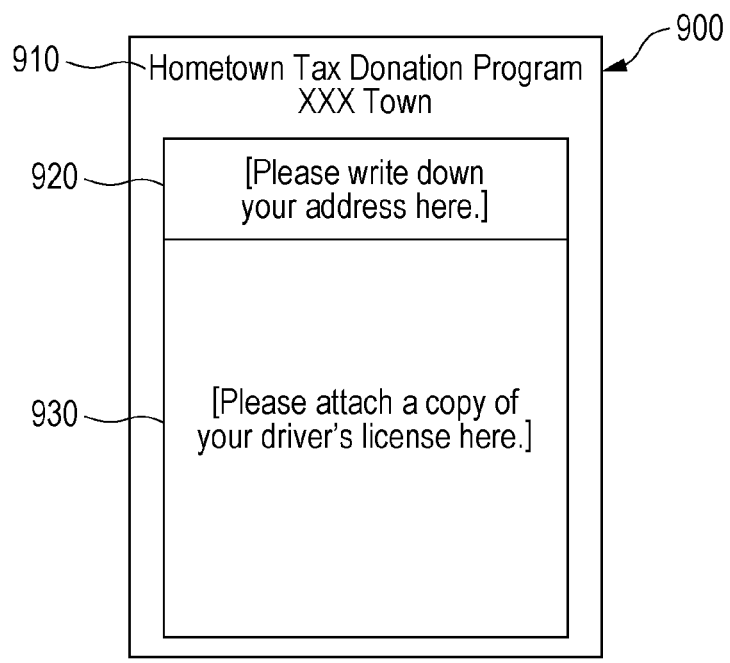
FIG. 9 illustrates an example of a document to be processed in the exemplary embodiment.

FIG. 9 illustrates an example of a document to be processed in the exemplary embodiment.

A document 900, which is a read document, has a title 910, an address field 920, and a driver's license attachment field 930. The title 910 shows that the name of the document 900 is "Hometown Tax Donation Program (one of the Japanese tax systems), XXX Town". In the address field 920, the character string "Please write down your address here" is written. In the driver's license attachment field 930, the character string "Please attach a copy of your driver's license here" is written. As in the example in FIG. 6, the address of the user and the image of the driver's license of the user are determined to be the required information. In this case, however, a document for creating an envelope for sending the document 900 is also required as an additional document. An example of this additional document will be explained below with reference to FIG. 10.

Figure 10:
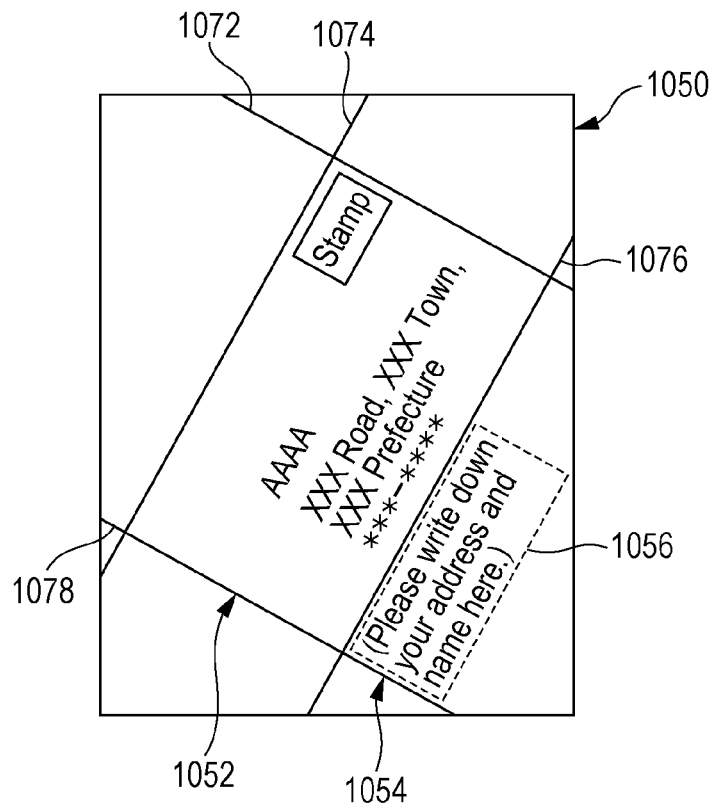
FIG. 10 illustrates an example of an additional document to be processed in the exemplary embodiment.

FIG. 10 illustrates an example of an additional document 1050 to be processed in the exemplary embodiment.

The additional document 1050 is divided into oblique regions defined by lines 1072, 1074, 1076, and 1078. To create an envelope by folding the lines 1072, 1074, 1076, and 1078, the regions defined by the lines 1072, 1074, 1076, and 1078 are obliquely located. It can be determined that the regions are obliquely located as a result of detecting a tilt of the lines 1072, 1074, 1076, and 1078 or a tilt of characters written inside and outside the regions.

In a receiver address region 1052, "XXX Road, XXX Town, XXX Prefecture, AAAA (addressee's name)" is written. In a sender address region 1054, "Please write down your address and name here", which is text 1056 indicating a request for a user, is written.

As a result of analyzing the form of the additional document 1050, for example, the additional document 1050 is found to be an envelope creating form, based on the aspect ratio of the receiver address region 1052 and a combination of the receiver address region 1052 and the text 1056, for example. Based on the table indicating the association between forms and items of required information for the individual forms, it is determined that the envelope creating form requires the address and the name of a user. It may alternatively be determined that the region next to the receiver address region 1052 showing the receiver is the sender address region 1054 in which the address and the name of the sender will be written.

As a result of analyzing the text in the additional document 1050, for example, the character string "Please write down your address and name here", which is the text 1056, is recognized. The required information is thus found to be the address and the name of the user.

Figure 11B:
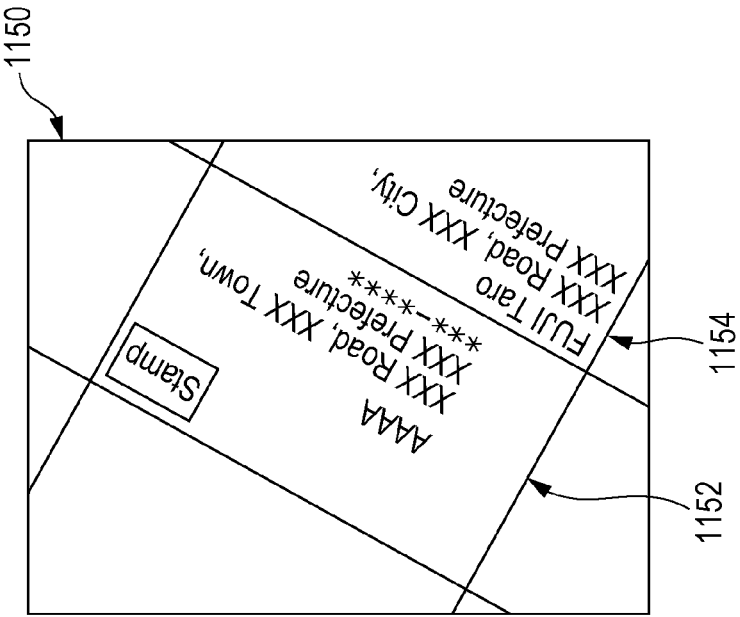
FIGS. 11A and 11B illustrate an example of a document and an example of an additional document, respectively, which are results of processing executed in the exemplary embodiment.
Figure 11A:
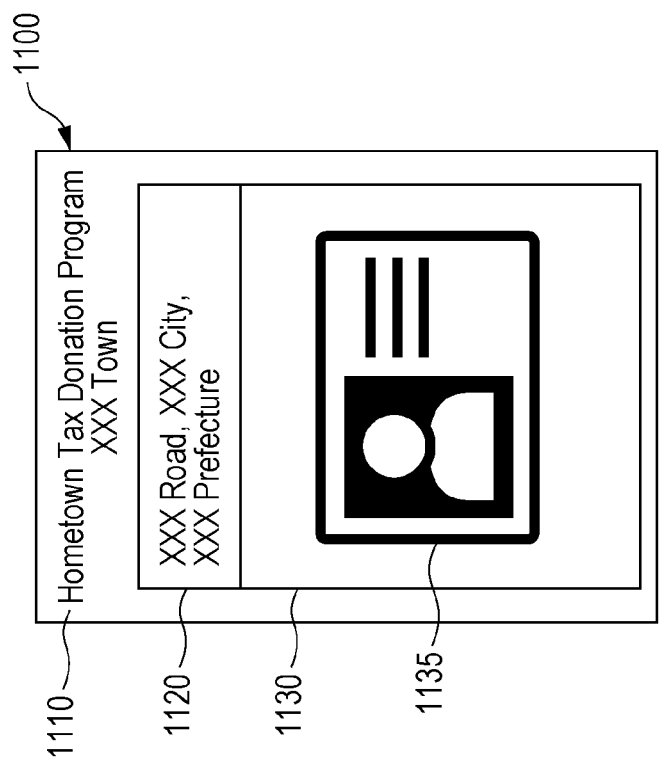

FIG. 11A illustrates an example of a document, which is the result of processing executed in the exemplary embodiment. FIG. 11B illustrates an example of an additional document.

FIG. 11A illustrates a document 1100, which is the result of reading the document 900 shown in FIG. 9 and combining the information concerning the user 390 with the document 900.

The document 1100 shown in FIG. 11A is an example of a printed sheet generated by the information processing apparatus 100 as a result of reading the document 900 in response to an instruction from the user 390. The document 1100 has a title 1110, an address field 1120, and a driver's license attachment field 1130. The title 1110 shows that the name of the document 1100 is "Hometown Tax Donation Program, XXX Town", as in the title 910 of the document 900. In the address field 1120, the address of the user 390 "XXX Road, XXX City, XXX Prefecture" is written. In the driver's license attachment field 1130, an image 1135 of the driver's license of the user 390 is attached.

FIG. 11B illustrates an additional document 1150, which is the result of reading the document 900 shown in FIG. 9 and combining the information concerning the user 390 with the additional document 1050 shown in FIG. 10.

In a receiver address region 1152, "XXX Road, XXX Town, XXX Prefecture, AAAA (addressee's name)" is written, as in the receiver address region 1052 of the additional document 1050. In a sender address region 1154, "XXX Road, XXX City, XXX Prefecture, FUJI (user's surname) Taro (user's name)", which is the address and the name of the user 390, is written.

Processing for combining an image with an additional document will be described below with reference to FIGS. 12 and 13.

Figure 12:
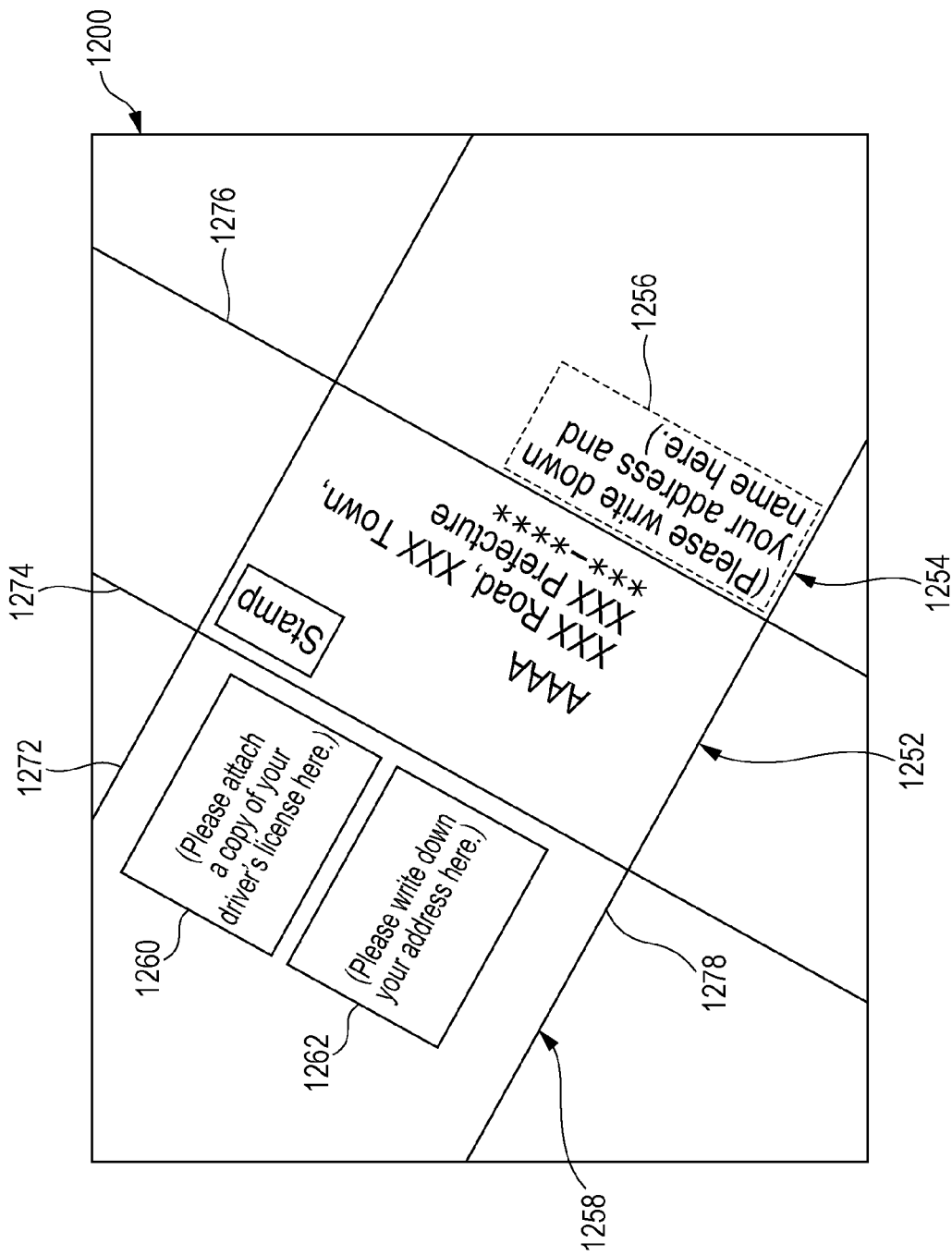
FIG. 12 illustrates an example of a document to be processed in the exemplary embodiment.

FIG. 12 illustrates an example of a document to be processed in the exemplary embodiment.

A document 1200 is a read document or an additional document. The document 1200 is divided into oblique regions defined by lines 1272, 1274, 1276, and 1278. To create an envelope by folding the lines 1272, 1274, 1276, and 1278, the regions defined by the lines 1272, 1274, 1276, and 1278 are obliquely located. It can be determined that the regions are obliquely located as a result of detecting a tilt of the lines 1272, 1274, 1276, and 1278 or a tilt of characters written inside and outside the regions.

In a receiver address region 1252, "XXX Road, XXX Town, XXX Prefecture, AAAA (addressee's name)" is written. In a sender address region 1254, "Please write down your address and name here", which is text 1256 indicating a request for a user, is written. A fill-in region 1258 has a driver's license attachment field 1260 and an address field 1262. In the driver's license attachment field 1260, the character string "Please attach a copy of your driver's license here" is written. In the address field 1262, the character string "Please write down your address here" is written.

As a result of analyzing the form of the document 1200, for example, the document 1200 is found to be an envelope creating form, based on the aspect ratio of the receiver address region 1252 and a combination of the receiver address region 1252 and the other regions, for example. Based on the table indicating the association between forms and items of required information for the individual forms, it is determined that the envelope creating form requires the address, the name, and the image of the driver's license of a user. It may be determined that the region right next to the receiver address region 1252 showing the receiver is the sender address region 1254 in which the address and the name of the sender will be written. It may also be determined that the region left next to the receiver address region 1252 is the driver's license attachment field 1260 in which the image of the driver's license of the user 390 will be attached and the address region 1262 in which the address of the user 390 will be written.

As a result of analyzing the text in the document 1200, for example, the character string "Please write down your address and name here", which is the text 1256, within the sender address region 1254 is recognized. The required information is thus found to be the address and the name of the user. The character string "Please attach a copy of your driver's license here" in the driver's license attachment field 1260 is recognized, and the required information is thus found to be the image of the driver's license of the user. The character string "Please write down your address here" in the address field 1262 is recognized, and the required information is thus found to be the address of the user.

FIG. 13 illustrates an example of an additional document, which is the result of processing executed in the exemplary embodiment. FIG. 13 illustrates the result of reading the document 1200 shown in FIG. 12 and combining the information concerning the user 390 with the document 1200. The additional document 1300 is a document in which information is filled in the document 1200.

In a receiver address region 1352, "XXX Road, XXX Town, XXX Prefecture, AAAA (addressee's name)" is written, as in the receiver address region 1252 in FIG. 12. In a sender address region 1354, "XXX Road, XXX City, XXX Prefecture, FUJI (user's surname) Taro (user's name)", which is the address and the name of the user 390, is written.

In the driver's license attachment field 1360, the image of the driver's license of the user 390 is attached. The image of the driver's license is rotated in accordance with a tilt of the frame of the driver's license attachment field 1360.

In an address filed 1362, "XXX Road, XXX City, XXX Prefecture, FUJI Taro", which is the address and the name of the user 390, is written. The character strings of the address and the name are rotated in accordance with a tilt of the frame of the address filed 1362.

The above-described program may be stored in a recording medium and be provided. The program recorded on a recording medium may be provided via a communication medium. In this case, the above-described program may be implemented as a "non-transitory computer readable medium storing the program therein" in the exemplary embodiment.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a CD read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. The program may be recorded in any form, for example, it may be compressed or encrypted, as long as it can be reconstructed.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
extract from a memory an image concerning a user in accordance with content of a document,
adjust the extracted image in accordance with a region to which the extracted image is to be attached, and
attach the adjusted image to the region of the document,
wherein the processor is configured to:
edit the extracted image so that an orientation of the extracted image matches a tilt of a region to which the extracted image is to be attached or a tilt of a character string around a region to which the extracted image is to be attached.

2. The information processing apparatus according to claim 1, wherein:
the content of the document is text in the document; and
the processor is configured to extract the image from the memory upon a determination that the document includes a predetermined character string, and attach the extracted image to a region of the document, the region having a predetermined relationship with the predetermined character string.

3. The information processing apparatus according to claim 1, wherein:

the content of the document is a form of the document; and the processor is configured to extract the image from the memory upon a determination that the form of the document is a predetermined form, and attach the extracted image to a region n the form.

4. The information processing apparatus according to claim 1, wherein the adjusting includes one or more of:

(a) enlarging the image,
(b) reducing the image,
(c) rotating the image, and
(d) converting color of the image.

5. A non-transitory computer readable medium storing a program causing a computer to execute a process, the process comprising:

extracting from a memory an image concerning a user in accordance with content of a document;

adjusting the extracted image in accordance with a region to which the extracted image is to be attached; and attaching the adjusted image to the region of the document, wherein the adjusting comprises editing the extracted image so that an orientation of the extracted image matches a tilt of a region to which the extracted image is to be attached or a tilt of a character string around a region to which the extracted image is to be attached.

6. An information processing apparatus comprising:

means for extracting from a memory an image concerning a user in accordance with content of a document;

means for adjusting the extracted image in accordance with a region to which the extracted image is to be attached; and means for attaching the adjusted image to the region of the document, wherein the means for adjusting comprises editing the extracted image so that an orientation of the extracted image matches a tilt of a region to which the extracted image is to be attached or a tilt of a character string around a region to which the extracted image is to be attached.

* * * * *